E. P. LARSH
June 9, 1931. SHORT CIRCUITING DEVICE FOR MOTOR COMMUTATORS Re. 18,093
Original Filed March 5, 1920
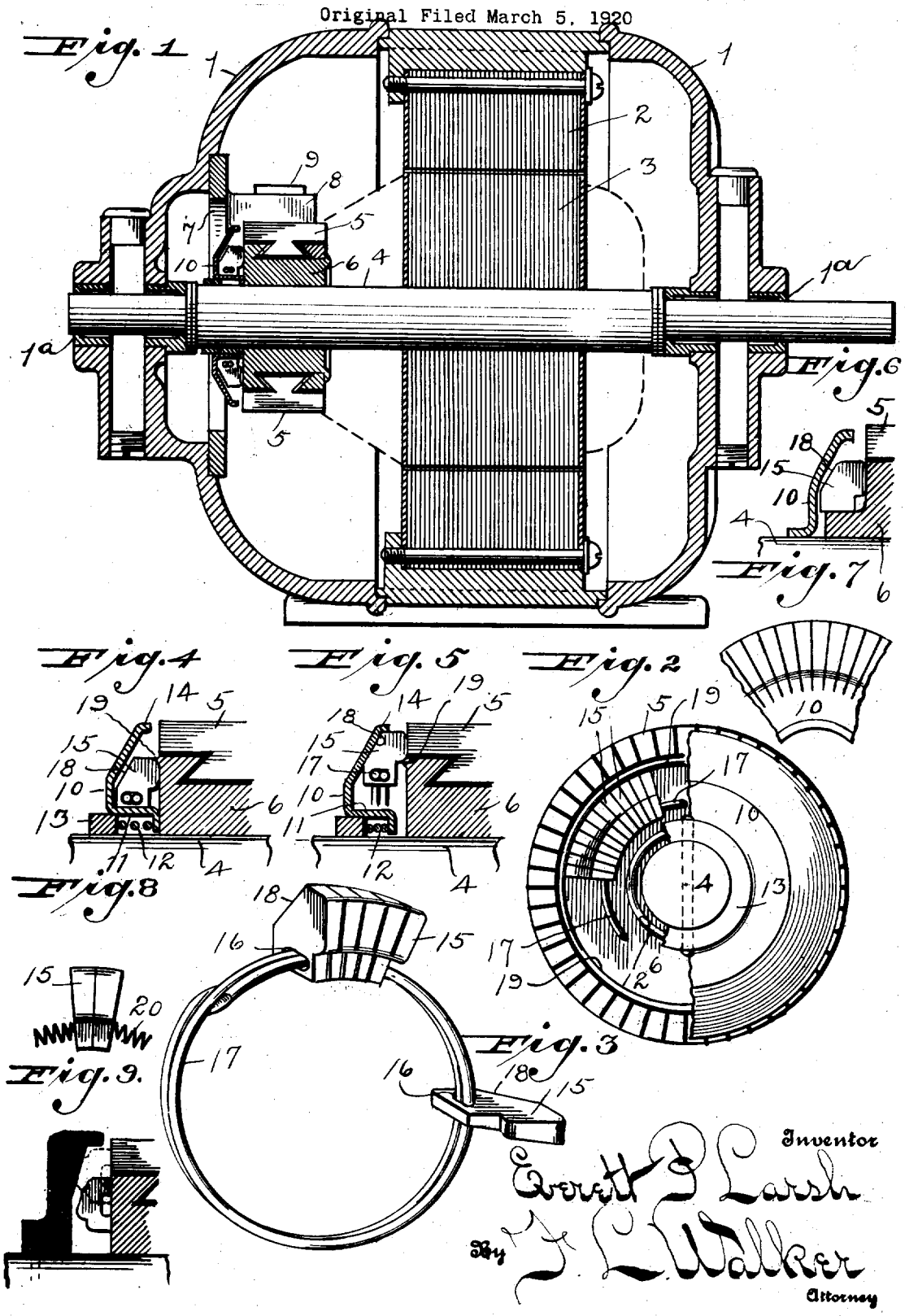

Reissued June 9, 1931

Re. 18,093

UNITED STATES PATENT OFFICE

EVERETT P. LARSH, OF DAYTON, OHIO, ASSIGNOR TO THE MASTER ELECTRIC COMPANY, OF DAYTON, OHIO, A CORPORATION OF OHIO

SHORT CIRCUITING DEVICE FOR MOTOR COMMUTATORS

Original No. 1,678,517, dated July 24, 1928, Serial No. 363,402, filed March 5, 1920. Application for reissue filed May 11, 1929. Serial No. 362,425.

This invention relates to electric motors and more particularly to a short circuiting or operation changing device for alternating current motors of the repulsion-induction type, by which the motor is automatically changed from a repulsion starting condition to an induction running condition and vice-versa, in accordance with variations of speed.

The object of the invention is to simplify the structure as well as the means and mode of operation of such circuit changing devices whereby they will not only be cheapened in construction, but will be more efficient in use, automatic in operation, uniform in action, automatically controlled, and unlikely to get out of repair.

A further object of the invention is to provide improved means operated by centrifugal force by which the commutator bars are automatically connected with a common electrical conductor which will promptly respond to variations of speed above and below a predetermined rate of rotation.

A further object of the invention is to provide a short circuiting or current changing device, which will have a wiping action insuring perfect electrical contact, in which this wiping action will be further effected under yielding pressure thereby obviating any chatter or vibration and the incident arcing and burning of the contact surfaces.

A further object of the invention is to provide means for controlling the movement of the short circuiting or current changing members whereby their movement to effect the alternation of the motor from repulsion to induction operation and vice-versa will be effected by a quick movement in either direction.

A further object of the invention is to provide such a short circuiting or current changing device which will be compact, of few parts, and having no pivot joints, nor indirect movement, but in which the current controlling devices are directly operated by centrifugal tendency.

With the above primary and other incidental objects in view as will more fully appear in the specification, the invention consists of the features of construction, the parts and combinations thereof, and the mode of operation, or their equivalents, as hereinafter described and set forth in the claims.

Referring to the drawings, Fig. 1 is a longitudinal sectional view of an electric motor to which the present invention has been applied. Fig. 2 is an end view of the commutator and short circuiting or current changing device forming the subject matter hereof, portions of which have been broken away. Fig. 3 is a detail perspective view of a series of contact slugs illustrating the manner of assembly upon the elastic retainer. Figs. 4 and 5 are detail sectional views showing the contact members or short circuiting devices in different positions of adjustment with the motor at rest in Fig. 4 and in full operation in Fig. 5. Figs. 6 and 7 illustrate a modification of the construction shown in the preceding figures. Fig. 8 illustrates a modification of the elastic retainer. Fig. 9 illustrates a further modification wherein electrical connection is effected between the commutator bars and the core, the retaining disc being immovably attached to the shaft.

Like parts are indicated by similar characters of reference throughout the several views.

The structure of the electric motor per se, forms no part of the present invention, which pertains wholly to the short circuiting means for the commutator bars, by which the motor is caused to operate alternately as a repulsion motor and an induction motor.

An alternating current, repulsion induction motor of the single phase type to which the present invention is particularly adapted is one which as the name indicates, starts as a repulsion motor and as the speed approaches its normal or maximum rate of rotation automatically changes its character, and runs as an induction motor. Briefly described it consists of a field or stator of laminated toothed construction having a single winding thereon connected to the supply circuit and a progressively wound armature or rotor with a commutator engaged by brushes during the starting or "repulsion" period together with speed controlled devices for short circuiting the armature windings thru the commutator after the armature has attained a predetermined speed, which speed controlled means in some instances lifts the brushes from the commutator simultaneously with the short circuiting operation. There is no electrical connection between the stator and the rotor. The currents in the stator create an alternating flux which reacts on the rotor and induces its rotation. This type of motor, therefore, starts as a simple repulsion motor without compensating or auxiliary windings and operates as a repulsion motor until the rotor or armature approaches a synchronous speed or one commensurate with the windings, whereupon the speed controlled devices operate to automatically short circuit the armature winding thru the commutator. Thus the motor is automatically transformed from a repulsion type into an induction motor having what is essentially a squirrel cage rotor. It is the improvement of the speed operated governing or short circuiting device which forms the subject matter of the present invention. One of the advantages of a machine of this type is that it is inherently a constant speed motor having a high starting torque with low current consumption or minimum current surge.

The straight repulsion motor without compensation gives the most efficient starting torque possible while the single phase induction rotor with the squirrel cage armature or its equivalent affords the most efficient motor when running.

A repulsion-induction type of motor combines these most desirable qualities in a single machine, as it possesses such high starting torque characteristics it is well adapted for operating machinery which starts under full load, as pumps air compressors, grinding mills, etc. Requiring no starter they are adapted for automatic control, or distance operation. They start quickly and operate quietly and smoothly.

The above is offered merely to facilitate a thorough understanding of the purpose of the invention, and with no intent nor desire that it shall in any way be construed as limiting or restricting the application or scope of the invention.

Referring to the drawings, 1 is the motor frame or housing, in which is located the annular stator 2, within which rotates the rotor 3, carried upon the shaft 4, mounted in suitable bearings $1^a$ in the opposite ends of the frame or housing. As shown in the drawings, the stator is of laminated form, while the rotor comprises the usual laminated core carrying a series of windings or coils (not shown in the drawing), the several coils being connected to corresponding commutator bars 5. The commutator comprises a plurality of the bars 5 suitably mounted upon and insulated from a head 6, and insulated or electrically isolated one from the other. The comutator comprising the head 6 and electrically separated commutator bars carried thereby is mounted upon the shaft 4 and rotates therewith together with the rotor 3. That is to say, the rotor, the shaft and the commutator form a single rotating element, as is ordinary in electric motors. Carried by a suitable annular collar or supporting ring 7 mounted in one of the end frames, are two brush holders 8 only one of which is shown in the drawings, which carry brushes 9, interconnected one with the other and bearing upon the periphery of the commutator. Such is the usual form of motor to which the present invention is applied.

The short circuiting device forming the subject matter hereof comprises a conductor collar 10, slidably mounted upon the shaft 4 adjacent to the commutator. This conductor disc 10 is of concave or dished formation, having at its center and surrounding the shaft 4 an inwardly flanged boss 11. This central boss 11 is of such extent that it engages the insulating head 6 of the commutator and forms a stop to limit the approach of the outer edge of the disc 10 toward the terminal faces of the commutator bars 5. The conductor disc 10 is pressed inwardly or toward the commutator by a helical spring 12 interposed between the inturned flange of the central boss 11 of said disc and a stop collar 13 fixed upon the rotor shaft 4. As shown in Figs. 4 and 5, this collar 13 may form a support or bearing for the disc 10 upon which the disc slides to and from the commutator. The inturned flange of the central boss of this disc may also have a sliding bearing upon the shaft 4. These bearings may be quite loose, and there will be but little friction or wear, at these bearing points. The outer periphery of the disc 10 is inturned or flanged at 14, to afford a limiting stop for the centrifugally controlled conductor slugs, hereafter described. The intermediate or web portion of the disc 10 is inclined or concaved to afford a cam surface against which the centrifugally controlled conductor slugs operate in their outward movement to afford a wedging action, which eventually shifts the conductor disc outward against the tension of its retracting spring 12.

Located intermediate the conductor disc 10 and the terminal face of the commutator is a series of radially disposed conductor slugs 15 of a substantially trapezoidal form. The number of these slugs greatly exceeds that of the commutator bars, there being preferably an average of one and a half to two conductor slugs 15 for each commutator bar. The slugs 15 have each a slotted opening 16 therein thru which extends an elastic retainer shown in Fig. 3 as two close coils of a helical spring 17. The slugs 15 are strung upon the elastic retainer 17 closely together in a bead like fashion, whereby upon contraction of the elastic retainer 17, they are drawn into close association one with the other. The series of slugs assembled upon the retaining ring 17 are normally loosely located within the disc 10 intermediate the disc and the commutator against which the perpendicular inner faces of the slugs are pressed by the retraction of the disc 10 under the influence of its spring 12 as the slugs move outwardly. The slugs 15 have an outer inclined edge or face 18 substantially agreeing with the inclination or concavity of the disc 10. It will be understood that the ring 17, while possessing sufficient tension to retract the slugs 15 when the rotor is at rest or operating at a subnormal speed, the tension is not sufficient to resist to any great degree, the outward movement of the slugs under influence of centrifugal tendency. The inner or perpendicular faces of the slugs which contact the face of the commutator are slightly beveled or rounded at their inner and outer ends to afford a runner-like action, which facilitates the sliding or wiping movement of the conductor slugs.

So long as the motor operates at a low rate of speed, the centrifugal tendency is not sufficient to overcome the inertia of the slugs. However, as the speed increases, the slugs 15 tend to move outward, expanding the retaining ring 17, and exerting a camming pressure of the inclined faces 18 upon the inclined or concave web or face of the disc 10. This camming action or wedging effect tends to increase the pressure of the contact of the slugs 15 upon the face of the commutator. As the speed and with it the centrifugal tendency increase, this camming pressure upon the disc 10 exerts sufficient force to move the disc 10 outwardly against the tension of its retracting spring 12, thus permitting the slugs to move radially outward until they have moved off of the insulated head 6 and into contact with the terminal faces of the commutator bars 5. These slugs 15 thus electrically bridge the individual commutator bars 5 with the common conductor disc 10. It will be understood that the retaining ring 17 is not necessarily a part of the short circuiting shunt. In fact, so far as the essential operation of the device is concerned, the retaining member 17 may be of non-conductive material. The circuit is completed from each commutator bar thru a slug 15 to the common conductor disc 10, thence to another commutator bar, so that all the commutator bars are interconnected one with the other thru the disc 10 and intervening slugs 15. This bridging of the individual commutator bars 5, and the conductor disc 10 common to all the bars interconnects the armature windings one with another and the armature now becomes in effect, a squirrel cage rotor.

Some constructors have thought it necessary or at least advisable to lift the brushes from contact with the commutator to prevent wear. However, the wear of the brush and commutator is so slight as to be negligible. The destruction of brushes heretofore attributed to wear has in fact been due to burning of the brush, through arcing between the brush and commutator. The constant arcing or sparking of the brush upon the commutator burns the surface of the brush away rather than wears it away. Inasmuch as when the commutator bars are electrically interconnected one with the other thru the disc 10 or short circuited, no arcing can occur between the brushes and the commutator, it has not been found necessary to lift the brushes or to separate them from the commutator bars.

As the speed of the rotor decreases and the centrifugal tendency becomes less effective, the conductor slugs 15, are retracted thru the combined tendency of the helical elastic retainer 17 and the pressure of the inclined web or face of the disc 10 under the influence of the retracting spring 12. This retracting tendency causes the slugs 15 to move inward passing in such movement from the conductor bars 5 to the insulated head 6, thereby breaking the contact between the commutator bars and the disc 10. This returns the rotor to the influence of the brushes 9 and the windings or coils connected with the separated commutator bars 5 whereby the motor again operates under repulsion influence.

In order that the conductor slugs 15 will not lag or drag in moving into and out of operative position, but will be given a quick action both into and out of operative position, the insulated head 6 may be formed with a circular restraining bead or rib 19, over which the lug must ride. The rib or bead 19 will restrain the movement of the lugs in either direction. In their outward movement, the slugs will abut upon the ring or bead until the centrifugal tendency is sufficient to overcome the obstacle, whereupon they will shift quickly to their outermost position. Likewise, upon retraction, the rib or bead 19 will restrain the slugs in their outermost position until the retractive force necessary to overcome the obstacle is sufficient to carry the slugs to their innermost or inactive positions. While the rib or bead is a desirable feature, it is not essential an may be dispensed with if so desired. Likewise while the elastic or expansible retainer 17 formed as shown of two helical coils is desirable, other forms of flexible connection may be employed. However, the retainer may be omitted, and the slugs assembled side by side intermediate the disc 10 and commutator entirely independent of each other. The slugs are sufficient in number and sufficiently closely associated that they cannot become materially disarranged, and the camming pressure of the disc 10 under the influence of the retracting spring 12 may be utilized to return the slugs to their normal or central positions.

In Figs. 6 and 7 there is shown a modification in which the retracting spring 12 has been omitted and the disc 10 fixedly attached to the shaft 4. In this construction the disc 10 is of resilient or yielding material. The disc is placed under tension by the outward movement of the slugs 15, thus exerting a direct pressure upon the slugs due to the resiliency of the disc. To further increase the resiliency and insure perfect contact of each slug with its corresponding commutator bar independent of other slugs, the conductor disc 10 may be radially slitted or scored as shown in Fig. 7, whereby the disc becomes a series of closely positioned radial fingers, which bear upon the adjacent slugs.

As a further modification a small helical spring 20 connected into an endless band or loop upon which the slugs 15 are strung may be substituted for the form of elastic retainer shown in Fig. 3. However, as before pointed out, with other conditions favorable, a string or other retainer devoid of elasticity, but possessing sufficient slack to permit the necessary movement of the slugs may be used in lieu of the expanding ring heretofore described.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In a short circuiting device for commutators a conductor head rotating in a plane parallel with the commutator but spaced therefrom, the adjacent faces of the communtator and conductor head being inclined in relation one with the other, a plurality of centrifugally actuated weights normally loosely positioned between the head and commutator and independent of both, said weights having divergent faces substantially parallel with the contact faces of the commutator bars and the conductor head, said weights being adapted by centrifugal tendency to be projected in the direction of convergence of said members into wedging contact with both said members, to interconnect the commutator bars and corresponding windings one with another thru said head.

2. In a short circuiting device for commutators a conductor head rotating in a plane parallel with the commutator but spaced therefrom, said contact head being yieldingly mounted for movement to and from the communtator, the adjacent faces of the conductor head and commutator being convergent in relation one with the other, and speed controlled circuit closing members having elongated opposite substantially straight edges, extending substantially parallel with the adjacent convergent faces of the commutator and conductor head, said members being loosely interposed between the head and commutator and adapted upon increase of speed of the armature to be projected into simultaneous engagement with the head and commutator bars against the yielding tension of the head by which they are pressed against the bars, to interconnect the armature windings one with another thru said circuit closers and head.

3. In a short circuiting device for commutators, the combination with a commutator including a series of bars and a supporting head therefor, terminating in a substantially common plane, an annular series of independent centrifugally actuated contact slugs located in a plane parallel with and adjacent to the terminal plane of the commutator bars and supporting head, said slugs having substantially straight marginal edges adjacent to the terminal planes of the commutator parts having sliding lineal contact in a radial direction upon the face of the commutator supporting head and thence onto the ends of correspondingly positioned commutator bars, by centrifugal influence and an elastic retaining band engaged with said slugs against the tension of which they effect their radial movement, and means for guiding said slugs during such radial movement to insure their engagement with the ends of the commutator bars.

4. In a short circuiting device for motors, the combination with a commutator, of a series of weight elements arranged circumferentially and movable radially, relative to the motor shaft, said weights having parallel inner edges extending in the direction of movement and having inclined outer peripheral edges, a circumferentially arranged tension member having co-operative engagement with the weights and movable outwardly through centrifugal action thereof, the outward movement of the weights under centrifugal influence being adapted to effect a wiping electrical interconnection of the commutator bars one with another.

5. In a short circuiting device for electric motors, the combination with a commutator of a retaining member upon the motor shaft spaced from the commutator and inclined relative thereto, a series of segmental weight elements operable radially between the commutator and said retaining member and having their outer ends inclined toward the commutator and annular elastic tension member having co-operative engagement with the weight elements against the tension of which the weight members operate in conjunction with the inclination of the retaining member to effect electrical interconnection of the commutator bars.

6. In a short circuiting device for electric motors, the combination with a commutator, of a retaining member upon the motor shaft in spaced relation with the commutator, a series of independent centrifugally actuated weight members interposed between the commutator and retaining member, said weight members having opposite marginal edges extending substantially parallel with the adjacent faces of the commutator and the retaining member respectively, and an annular elastic spring member against the tension of which the weight members are radially operable intermediate the retaining member and commutator to effect electrical interconnection between the commutator bars and retaining member.

7. In a short circuiting device for electric motors, the combination with a commutator, of a retaining member upon the motor shaft in spaced relation with the commutator, a series of independent centrifugally actuated weight members interposed between the commutator and retaining member, said weight members being radially movable under centrifugal influence and having substantially straight marginal edges having extended lineal wiping engagement with the commutator and retainer respectively, an expansible and contractible annular tension member having operative engagement with the weights of the series, against the yielding tension of which the weights move radially under centrifugal influence to effect electrical interconnection of the commutator bars one with another.

8. In a short circuiting device for commutators, a plurality of speed controlled circuit closers having a sliding engagement in a radial direction upon the commutator, and an offset upon the commutator in the path of movement of the circuit closers tending to resist the movement thereof substantially as and for the purpose specified.

9. In a short circuiting device for commutators, a plurality of speed controlled circuit closers having a sliding engagement in a radial direction upon the commutator, and an annular bead upon the lateral face of the commutator overridden by the circuit closers in their operative movement tending to temporarily resist the movement thereof, substantially as and for the purpose specified.

10. In a short circuiting device for commutators, a plurality of speed controlled circuit closers slidingly movable into and out of engagement with the commutator bars, and an unyielding obstacle in the path of movement of the circuit closers and deflecting such circuit closers out of their normal plane of radial movement in order to be overridden thereby and adapted to temporarily resist the movement thereof substantially as and for the purpose specified.

11. In a short circuiting device for commutators, a series of commutator bars to be interengaged, an annular series of contact slugs in juxtaposition thereto and radially movable by centrifugal influence, elongated outer margins upon the slugs inclined to the axis of rotation of the commutator, and a yielding spring actuated member engaging the inclined faces in the outward movement of the slugs against the tension of which said slugs are radially movable into engagement with the commutator bars.

12. In a short circuiting device for commutators, a series of commutator bars to be interengaged, an annular series of contact slugs loosely positioned in juxtaposition thereto and radially movable by centrifugal influence, said slug being capable of limited lateral deflection in addition to their radial movement, flat faces upon the slugs inclined to the axis of rotation of the commutator, and yielding means engaging the inclined faces by which the slugs are deflected toward the commutator bars in unison with their radial movement.

13. In a short circuiting device for commutators, a series of commutator bars to be interengaged, an annular series of contact slugs in juxtaposition thereto and radially movable by centrifugal influence, flat marginal faces upon the slugs inclined to the axis of rotation of the commutator, and a concentric control member exteriorly enclosing the series of slugs and engaging the flat marginal inclined faces thereof upon which it exerts a camming pressure in opposition to centrifugal influence to yieldingly resist their radial movement.

14. In a short circuting device for commutators, a series of commutator bars to be interengaged, an annular series of contact slugs in juxtaposition thereto capable of limited movement to and from the commutator, and further radially movable by centrifugal influence, substantially flat faces upon the slugs forming upon the series of such slugs a circumferential surface inclined to the axis of rotation of the commutator, and a concentric member surrounding the series of slugs upon which the inclined faces of the slugs exert a camming action in their radial movement to deflect said slugs toward the commutator bars.

15. In a short circuiting device for commutators, a series of commutator bars to be interconnected, a disc yieldingly mounted in spaced relation with the commutator, a spring yieldingly urging the disc towards the commutator, an annular series of radially disposed centrifugally actuated contact members located intermediate the movable disc and the commutator and movable to alternate positions from each of which their movement is yieldingly resisted by said disc, an annular contractile band against the tension of which the contact members are actuated into engagement with the commutator bars by centrifugal influence, the yielding resistance of the movable disc being opposed to the retroactive influence of the contractile band when the contact members are in their bar engaging position to temporarily restrain the retroactive movement of the contact members as the centrifugal influence decreases, means for effecting retractive movement of the disc against the tension of its spring under influence of increased retractive pressure of the contact members to permit the retraction of the contact members.

16. In a short circuiting device for commutators, a series of commutator bars to be interconnected, an annular series of radially disposed centrifugally actuated contact members movable to alternate positions, an annular contractile band against the yielding resistance of which the contact members are actuated into short circuiting engagement with the commutator bars by centrifugal influence, an axially movable disc located in juxtaposition to the movable contact members, a spring pressing the disc against the contact members, to urge the contact members laterally into engagement with the commutator bars and temporarily restrain their retractive movement, and means for effecting a retractive movement of said disc against the tension of its spring to permit the return movement of the contact members under influence of the contractile band.

17. In a short circuiting device for commutators, a series of commutator bars to be interconnected, an annular series of radially disposed, centrifugally actuated contact members, an annular contractile band against the yielding resistance of which the contact members are actuated into short circuiting engagement with the commutator bars by centrifugal influence, and retarding means yieldingly restraining the retractive movement of the contact members under the contractile influence of the band, said retarding means being overcome by the retractive pressure of the contact members.

18. In a short circuiting device for electric motors, an annular series of radially disposed weights arranged circumferentially of the motor shaft and actuated by centrifugal influence to effect the short circuiting of the motor windings, an annular contractile band common to all the weights against the yielding resistance of which the weights are actuated, an axially movable disc yieldingly pressed against the weights when in their operated positions to temporarily restrain their retractive movement, and a spring against the tension of which the disc is retracted and means by which the retractive pressure of the weights will retract the disc to permit the return of the weights under the contractile influence of the band.

19. In a short circuiting device for electric motors, an annular series of radially disposed weights arranged circumferentially of the motor shaft and actuated by centrifugal influence to effect the short circuiting of the motor windings, an annular contractile band common to all the weights against the yielding resistance of which the weights are actuated, and a second spring member opposing the contractile influence of the band to temporarily restrain the weights in their operated positions, and means for automatically retracting said spring to release the weights for return movement when the centrifugal influence has subsided.

20. In a short circuiting device for electric motors, a commutator having a series of bars to be interconnected, a disc mounted in spaced relation with the commutator bars for axial movement upon the motor shaft, a recessed hub portion carried by the disc and extending toward the commutator, a helical spring enclosed within said recessed hub and surrounding the motor shaft, an annular series of radially disposed centrifugally actuated weights arranged circumferentially of said hub portion intermediate the disc and commutator, an annular contractile band common to the weights against the yielding resistance of which the weights are movable under centrifugal influence to effect the short circuiting of the commutator bars, said disc normally tending to hold said weights against movement, and means for effecting a retractive movement of the disc against the tension of its spring to permit the return movement of the weights.

21. In a short circuiting device for electric motors, a commutator having a series of bars to be interconnected, a disc mounted in spaced relation with the commutator bars for axial movement upon the motor shaft, a helical spring surrounding the motor shaft, and exerting pressure upon said disc, an annular series of radially disposed centrifugally actuated weights arranged circumferentially of said hub portion intermediate the disc and commutator, an annular contractile band common to the weights against the yielding resistance of which the weights are movable under centrifugal influence to effect the short circuiting of the commutator bars, and means by which said weights exert lateral pressure upon the disc to retract said disc against the tension of its spring simultaneously with their retractive movement under the contractile influence of the band.

22. In a short circuiting device for electric motors, a commutator having a series of bars to be interconnected, a disc mounted in spaced relation with the commutator bars for axial movement upon the motor shaft, a helical spring surrounding the motor shaft, and exerting pressure upon said disc, an annular series of radially disposed centrifugally actuated weights arranged circumferentially of said hub portion intermediate the disc and commutator, an annular contractile band common to the weights against the yielding resistance of which the weights are movable under centrifugal influence to effect the short circuiting of the commutator bars, and two springs exerting opposing influences upon said weights when in operated position, in which the spring tends to retract the weights, and means whereby the other spring is caused to oppose such retraction until overcome by the influence of the first spring, the dominance of one spring over the other being controlled by the supplemental effect of centrifugal influence.

23. In a short circuitor for motors, a series of bars to be electrically interconnected, a short circuiting means including an annular series of weights arranged circumferentially of and movable radially under centrifugal influence relative to the motor shaft to effect the electrical interconnection of said bars and governor means therefor including two independent spring elements controlling the movement of said weights, said spring elements being both placed under tension by the outward movement of the weights under centrifugal influence, and means for opposing the tension of one of the springs to that of the other spring upon initiation of the return movement of the weights upon diminution of the centrifugal influences.

24. In a short circuiting device for commutators, a disc mounted for rotation in a plane parallel with the commutator but spaced therefrom, the adjacent faces of the disc and commutator being convergent one toward the other, centrifugally actuated short circuiting means normally loosely positioned between the disc and the commutator adapted to be expanded by centrifugal influence in the direction of convergence of said disc and commutator and into wedging contact with both said members to interconnect the commutator bars and corresponding windings one with the other.

25. In a short circuiting device for commutators, a disc mounted for rotation in parallel spaced relation with the commutator, said disc being marginally deflected in the direction of the commutator, an annular expansible short circuiting means normally loosely interposed between the disc and commutator and expansible by centrifugal influence into simultaneous engagement with the deflected margin of the disc and the commutator bars to electrically interconnect the bars one with another.

26. In a short circuiting device for electric motors, a series of commutator bars to be electrically interconnected, an annular series of centrifugally actuated contact members located in juxtaposition to the lateral face of the commutator, and an annular contractile spring means concentrically arranged exteriorly of the contact members, against the tension of which said members are radially slidable upon the commutator bars to afford wiping engagement therewith under the action of centrifugal influence.

27. In a short circuiting mechanism for single phase alternating current motors and in combination with the armature and commutator thereof, a plurality of centrifugal elements arranged circumferentially of the armature shaft, and operable radially to effect contact relation with the commutator segments, and a disc of resilient material radially slit at spaced intervals to form a succession of spring fingers operatively engaging with the centrifugal elements to resist the radial movement of said elements and to exert pressure thereon at an angle to said movement.

28. In a short circuiting device for motors, a plurality of centrifugal elements arranged circumferentially and operable radially relative to the armature shaft and a flexible circular resistance element fixedly mounted on the shaft axially of said centrifugal elements and acting to restrain the centrifugal action thereof as said elements are brought in contact with the commutator.

29. In a short circuiting device for motors, a plurality of centrifugal elements arranged circumferentially and operable radially relative to the armature shaft, and an annular series of radially disposed spring fingers fixedly mounted upon the shaft and operatively engaging said centrifugal elements and acting to restrain the centrifugal action thereof and to exert lateral pressure thereon as said elements are brought in contact with the commutator.

30. A short circuiting device for electric motors including in combination with the commutator, a short circuiting element consisting of a series of weights arranged circumferentially of and tapered toward the motor shaft, one weight acting to restrain another laterally, all the weights being operable slidably outwardly by centrifugal action into contact with the commutator and a yieldable resistance element common to all the weights engaging the tapered portions thereof, and coacting therewith to restrain said outward movement thereof.

31. In a short circuiting device for motors, a series of centrifugally actuated elements arranged circumferentially and movable radially relative to the armature shaft, said series of elements being circumferentially beveled, and a yieldable resistance element engaging the circumferentially beveled surface of the series of elements to restrain the centrifugal action thereof, and against the resistance of which the said elements move into contact with the commutator bars.

32. A short circuiting device for electric motors including in combination with a commutator, a plurality of weight elements arranged circumferentially and operable radially relative to the axis of rotation of the commutator, a disc like spring element stationarily secured in concentric relation with the plurality of weight elements coacting with the outer ends of said weight elements to yieldingly restrain the radial movement thereof, and acting further on said elements with gradually increasing lateral pressure thereon to cause said elements to effect wiping contact with the commutator.

33. A short circuiting device for electric motors including in combination with a commutator, a plurality of weight elements arranged circumferentially and operable radially relative to the axis of rotation of the commutator, a spring element cocating with the outer ends of said weight elements to restrain the radial movement thereof and acting further on said elements to cause the same to form contact relation with the commutator under pressure.

34. A short circuiting device for electric motors, including in combination with a commutator, a plurality of weight elements arranged circumferentially and operable radially relative to the axis of rotation of the commutator, a spring element coacting with the outer ends of said weight elements to restrain the radial movement thereof and acting further to exert lateral pressure on said elements to cause the same to effect wiping contact with the commutator.

35. A short circuiting device for electric motors, including in combination with a commutator, a short circuiting element consisting of a series of segmental weights having inclined outer ends, arranged circumferentially of and slidable radially relative to the motor shaft through centrifugal action to engage the commutator to effect short circuiting of the motor, and a concentrically arranged expansible and contractible tension member in engagement with said inclined ends and acting to restrain outward movement of the weights and to force the same against the commutator with increasing pressure.

36. A short circuiting device for electric motors, including in combination with the commutator a short circuiting element consisting of a series of segmental weights, having inclined outer ends, arranged circumferentially of the motor shaft and slidable radially through centrifugal action into engagement with the commutator to effect short circuiting of the motor, and an axially arranged spring member in engagement with all of said weights and acting to restrain the same in slidable movement.

37. A short circuiting device for electric motors, including in combination with the commutator, a short circuiting element consisting of a series of segmental weights having inclined outer ends, arranged circumferentially of the motor shaft and slidable outwardly through centrifugal action into wiping engagement with the commutator to effect short circuiting of the motor, and an axially arranged spring member in engagement with said inclined ends and acting to restrain said sliding movement of the weights and to force the same against the commutator with increasing pressure as said wiping engagement is made therewith.

38. In short circuiting mechanism for single phase, alternating current motors, and in combination with the armature and commutator thereof, a plurality of centrifugal elements arranged circumferentially and radially relative to the armature shaft, and a spring element arranged concentrically relative to the centrifugal elements and adapted to exert resistance thereon at an angle to their said radial movement whereby pressure is provided for establishing wiping contact between said centrifugal elements and the commutator segments.

39. In a short circuiting mechanism for single phase alternating current motors and in combination with the armature and commutator thereof, a plurality of centrifugal elements retained as to lateral displacement and arranged circumferentially and radially relative to the armature shaft, and a circular spring element arranged axially of the centrifugal elements and adapted to exert resistance thereon at an angle to their said radial movement, whereby pressure is provided for establishing wiping contact between said centrifugal elements and the commutator segments.

40. In short circuiting mechanism for single phase alternating current motors and in combination with the armature and commutator thereof, a plurality of weight elements arranged circumferentially and operable radially relative to the armature shaft and having their outer ends beveled, a spring element co-operating with the beveled ends of said weights, said weight elements being electrically conductive and adapted to be moved into contact with the commutator to short circuit the armature whereby said contact is made with increasing pressure as the weights move outwardly.

41. In short circuiting mechanism for single phase, alternating current motors, and in combination with the armature and commutator thereof, a plurality of weight elements arranged circumferentially and operable radially relative to the armature shaft, a circular spring element arranged axially of the weights and adapted to exert resistance thereon at an angle to said radial movement whereby pressure is provided for establishing wiping contact between one of said elements and the commutator.

42. In short circuiting mechanism for single phase, alternating current motors, and in combination with the armature and commutator thereof, a plurality of weight elements arranged circumferentially and operable radially relative to the armature shaft, a spring element arranged circumferentially of the weight elements, and adapted to exert resistance thereon in a plane angular to the plane of said radial movement, said weight elements being electrically conductive and adapted to be moved into contact with the commutator to short circuit the armature, whereby said contact is made with increasing pressure as the weights move outwardly.

In testimony whereof, I have hereunto set my hand this 11th day of April 1929.

EVERETT P. LARSH.